(12) United States Patent
Uehara et al.

(10) Patent No.: US 8,149,375 B2
(45) Date of Patent: Apr. 3, 2012

(54) DISPLAY PANEL AND MANUFACTURING METHOD THEREOF

(75) Inventors: Hideki Uehara, Tottori (JP); Yoshiaki Aramatsu, Tottori (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 12/473,494

(22) Filed: May 28, 2009

(65) Prior Publication Data
US 2009/0316080 A1 Dec. 24, 2009

(30) Foreign Application Priority Data
Jun. 24, 2008 (JP) .................. 2008-164118

(51) Int. Cl.
*G02F 1/13* (2006.01)
*H01L 21/00* (2006.01)

(52) U.S. Cl. .......................... 349/187; 438/30

(58) Field of Classification Search .................. None
See application file for complete search history.

(56) References Cited

U.S. PATENT DOCUMENTS
6,296,977 B1 * 10/2001 Kaise et al. .................... 430/30

FOREIGN PATENT DOCUMENTS
| JP | 05061010 A | * | 3/1993 |
| JP | 2001-166121 | | 6/2001 |
| JP | 2007-304501 | | 11/2007 |

* cited by examiner

*Primary Examiner* — Michelle R Connelly Cushwa
(74) *Attorney, Agent, or Firm* — K&L Gates LLP (57) ABSTRACT

There is provided a display panel formed by segmenting a large sized substrate into an individual substrate along alignment marks, remaining portions of the alignment marks being formed in the display panel. A remaining portion of a slant mark formed by a plurality of scale lines arranged in parallel to each other is formed between the remaining portions of the alignment marks.

8 Claims, 6 Drawing Sheets

DISPLAY PANEL AND MANUFACTURING METHOD THEREOF

BACKGROUND

1. Technical Field

The present invention relates to a display panel in which a remaining portion of a slant mark for testing accuracy of a position at which an individual substrate is segmented from a large sized substrate is formed and to a manufacturing method thereof. In particular, the invention relates to a display panel in which a remaining portion of a slant mark formed by a plurality of scale lines arranged in parallel to each other in a stepwise manner at a position apart from a corner of an individual substrate is formed, and to a manufacturing method thereof.

2. Related Art

A flat panel such as a liquid crystal display panel, an organic electro luminescence display panel, or the like has characteristics that it is lightweight, thin, and it is operated with low power consumption, and the flat panel is used in many electronic apparatuses. When the flat panel is manufactured, a method is generally employed in which a large sized panel formed by a glass substrate is segmented into individual panels having a predetermined size. As is disclosed in JP-A-2001-166121 and JP-A-2007-304501, the segment method is performed by positioning the large sized panel based on alignment marks formed therein, and by segmenting the large sized panel by a cutter (or laser). The alignment mark is provided at each corner of the individual substrate, and has a gap width (tolerance) for showing allowance of deviation of the cutter. The cutter is passed through within the gap of the alignment mark and the large sized panel is segmented. Herewith, the individual panel is manufactured. Then, after segmented into the individual panel, testing of whether the individual panel is cut within the tolerance or not can be performed by examining the segmented state of the alignment mark remained in the individual panel.

Recently, in order to improve shape accuracy of the display panel, not only a size tolerance of the display panel, but also a slant tolerance (for example, ±0.1 degrees) of a segment line (hereinafter, line after cut is referred to as segment line, and target line before cut is referred to as virtual cutting line) is added in the display panel. The conventional alignment mark is provided for the purpose of positioning of a cutter when segmented, so that only a gap having a predetermined width showing an acceptable range of the segment positional deviation is formed in the alignment mark. In addition, after segmented, the alignment mark is also segmented. Consequently, in the conventional alignment mark, it has been difficult to measure a cut size with high accuracy, and in particular, it has been impossible to directly examine the slant of the segment line. Further, since the conventional alignment mark is formed at a corner of the individual display panel, there is a case that the alignment mark is cracked, and testing of whether the individual panel is cut within a tolerance or not can not be performed.

SUMMARY

An advantage of some aspects of the invention is to provided a display panel which makes it possible to confirm size accuracy even when a corner of an individual panel is cracked, and to measure a cut size with high accuracy by allowing testing of a slant of a segment line, and a manufacturing method of the display panel.

According to an aspect of the invention, there is provided a display panel formed by segmenting a large sized substrate into an individual substrate along alignment marks, remaining portions of the alignment marks being formed in the display panel. A remaining portion of a slant mark formed by a plurality of scale lines arranged in parallel to each other is formed between the remaining portions of the alignment marks.

When the large sized substrate is segmented along the alignment marks formed therein, the remaining portions of the alignment marks are formed in the individual substrate. The remaining portions of the alignment marks are formed by segmenting the alignment marks formed in the large sized substrate. Accordingly, when a corner of the individually segmented substrate is cracked, there is a case that the remaining portion of the alignment marks is cracked.

However, in the display panel of the aspect of the invention, the remaining portion of the slant mark is formed between the remaining portions of the alignment marks. The remaining portion of the slant mark formed between the alignment marks formed in the large sized substrate is segmented and formed at the same time when the large sized substrate is segmented into the individual substrate along the alignment marks. When the large sized substrate is segmented into the individual substrate along the alignment marks, it is rare that the individual substrate is cracked except the corners thereof. Accordingly, according to the display panel of the aspect of the invention, even when the remaining portion of the alignment mark is cracked due to cracking of the corner of the individual substrate, the similar functions as the remaining portions of the conventional alignment marks can be provided by the remaining portion of the slant mark.

In addition, in the display panel according to the aspect of the invention, the remaining portion of the slant mark formed between the remaining portions of the alignment marks are formed by a plurality of scale lines arranged in parallel to each other. Consequently, according to the display panel according to the aspect of the invention, the positional deviation of the segment line, and the slant of the segment line can be respectively measured with high accuracy from a relative positional relationship between a scale line of the remaining portion of the slant mark and the segment line, and the slant of the segment line with respect to a scale line of the remaining portion of the slant mark. Note that the display panel according to the aspect of the invention includes a liquid crystal display panel, an organic electro luminescence display panel, or the like as far as the individual display panel is manufactured by segmenting the large sized substrate into the individual substrate along the alignment marks formed therein.

It is preferable that the plurality of scale lines arranged in parallel to each other are formed in a stepwise manner in the display panel according to the aspect of the invention.

When the scale lines of the remaining portion of the slant mark are formed in a stepwise manner, it becomes easy to read an arrangement relationship between the scale lines and the segment line as compared with the case where all of the lengths of the scale lines are equal. Accordingly, according to the display panel according to the aspect, the arrangement relationship between the scale lines and the segment line can be read also by using a small sized hand glass whose magnification is low, for example, not a microscope, but a loupe or even by visual contact. Accordingly, testing of size accuracy of the individual display panel can be performed with a cheap device and within a short time. Note that as for the plurality of scale lines arranged in parallel to each other in a stepwise manner, there are included a plurality of short scale lines respectively arranged in parallel to each other in a stepwise manner, a plurality of scale lines whose lengths are different to each other arranged in parallel to each other in the order of length in an upward stepwise manner, a plurality of inclined scale lines arranged in parallel, scale lines having a wedge shape being formed in each of the inclined line, and the like.

It is also preferable that the plurality of scale lines arranged in parallel to each other are arranged with a predetermined constant pitch in the display panel according to the aspect of the invention.

According to the display panel according the aspect, it becomes easy to read a center value of the relative positional relation between the plurality of scale lines arranged in parallel to each other and the segment line, so that it becomes possible to perform testing of size accuracy of the individual display panel with higher accuracy.

It is also preferable that the predetermined constant pitch is narrower than a predetermined tolerance size of the alignment mark in the display panel according to the aspect of the invention.

According to the display panel according the aspect, the positional deviation of the segment line can be detected with higher accuracy than accuracy of positioning, and testing of the slant of the segment line can be also performed with high accuracy.

It is also preferable that the predetermined constant pitch is 10 μm in the display panel according to the aspect of the invention.

According to the display panel according the aspect, it becomes easy to perform testing of the positional deviation and the slant of the segment line with high accuracy even when a cheap loupe whose magnification is about 20 is used or even by visual contact.

It is also preferable that the remaining portion of the slant mark is equipped with a number display for every predetermined pitch in the display panel according to the aspect of the invention.

According to the display panel according the aspect, a specific position of the plurality of parallel scale lines arranged in parallel to each other cay be easily judged by the number display, so that the positional deviation and the slant of the segment line can be precisely measured.

It is also preferable that the remaining portion of the alignment mark is formed at each corner of the individual substrate, and at least two of the remaining portions of the slant marks are formed between the remaining portions of the alignment marks in the display panel according to the aspect of the invention.

According to the display panel according to the aspect, the remaining portions whose slants are different to each other can be formed. Herewith, even when the segment line is positively or negatively inclined, the positional deviation and the slant of the segment line can be measured with the scale of the remaining portion of at least any one of the slant marks.

It is also preferable that the display panel is equipped with a first substrate and a second substrate, the remaining portion of the alignment mark and the remaining portion of the slant mark are formed in both of the first substrate and the second substrate, and at least one of colors or shapes of the remaining portions of the slant marks formed in the first substrate and the second substrate are different in the display panel according to the aspect of the invention.

According to the display panel according to the aspect, both of the remaining portions of the slant marks of the substrates can be viewed in the case where the first substrate and the second substrate are transparent. Accordingly, it becomes easy to judge that the viewed remaining portion of the slant mark is the remaining portion of the slant mark of the substrate which is to be tested or the remaining portion of the slant mark of the other substrate.

According to another aspect of the invention, there is provided a method of manufacturing a display panel including a step of segmenting a large sized substrate into an individual substrate along alignment marks formed in the large sized substrate. The method of manufacturing a display panel includes forming a slant mark formed by a plurality of pairs of scale lines that are symmetric to each other with respect to a center line, the center line being coincident with a center line between the alignment marks, and segmenting the slant mark at the same time when the large sized substrate is segmented into the individual substrate along the alignment marks to from remaining portions of the alignment marks and a remaining portion of the slant mark in the individual substrate.

According to the method of manufacturing a display panel according to the aspect of the invention, it becomes easy to manufacture the display panel according to the aspect of the invention that easily provides the aforementioned effects.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the best embodiment of the invention will be described with reference to the accompanying drawings. In this regard, in the embodiment described below, a liquid crystal display panel of a horizontal electric field system is exemplified as a display panel for embodying the technical idea of the invention, and it is not intended that the invention is restricted to the liquid crystal display panel, and the invention may be applied also to another embodiment included in the scope of the claims. Note that in each drawing used for illustrating the specification, scale sizes are different for each layer and each member in order to show each layer and each member in a recognizable manner in the drawings, so that it is not necessarily the case that the sizes thereof in the drawings proportional to the real sizes.

Figure 1:
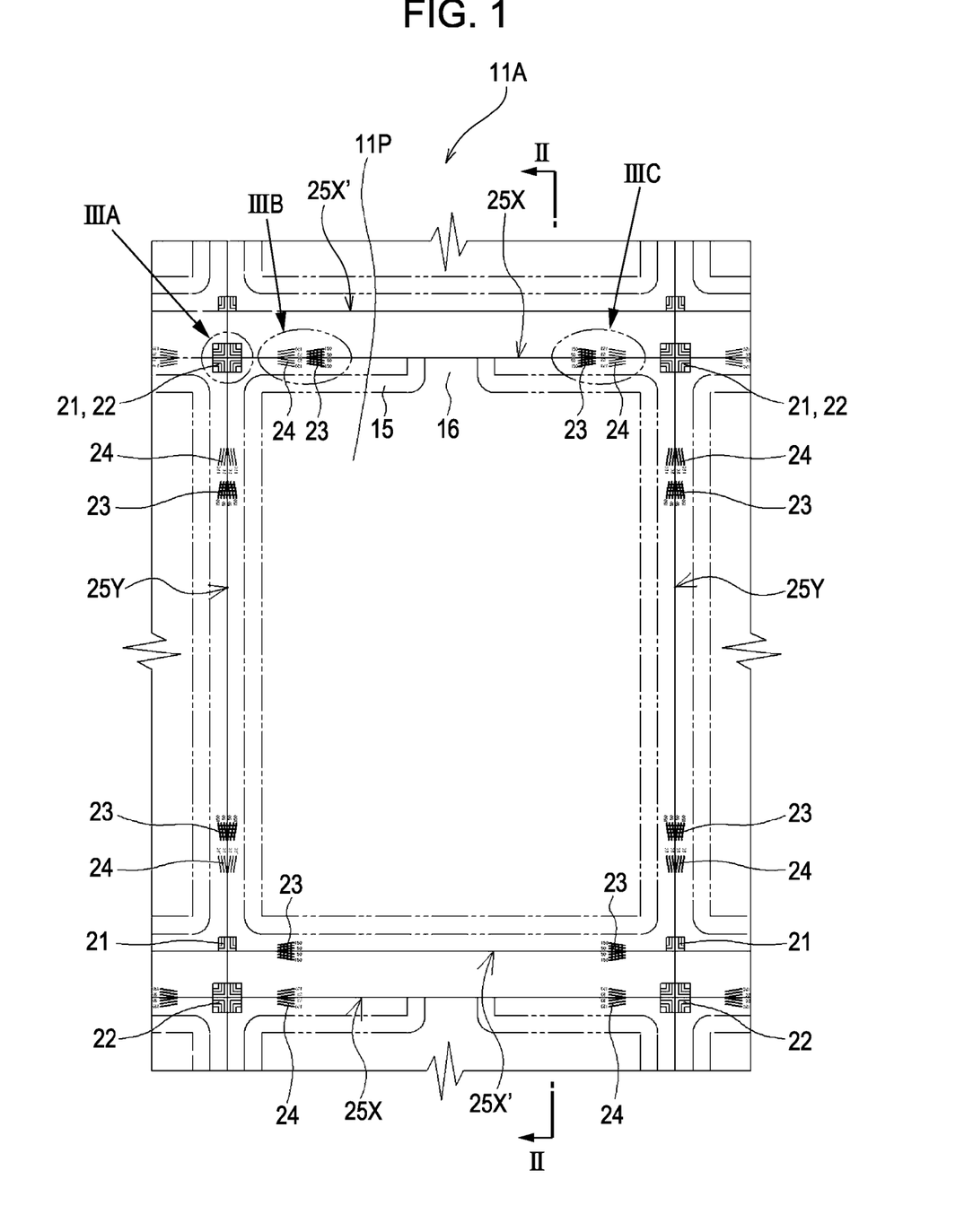
FIG. 1 is a partial plan view showing a large sized display panel according to a first embodiment.
Figure 2:
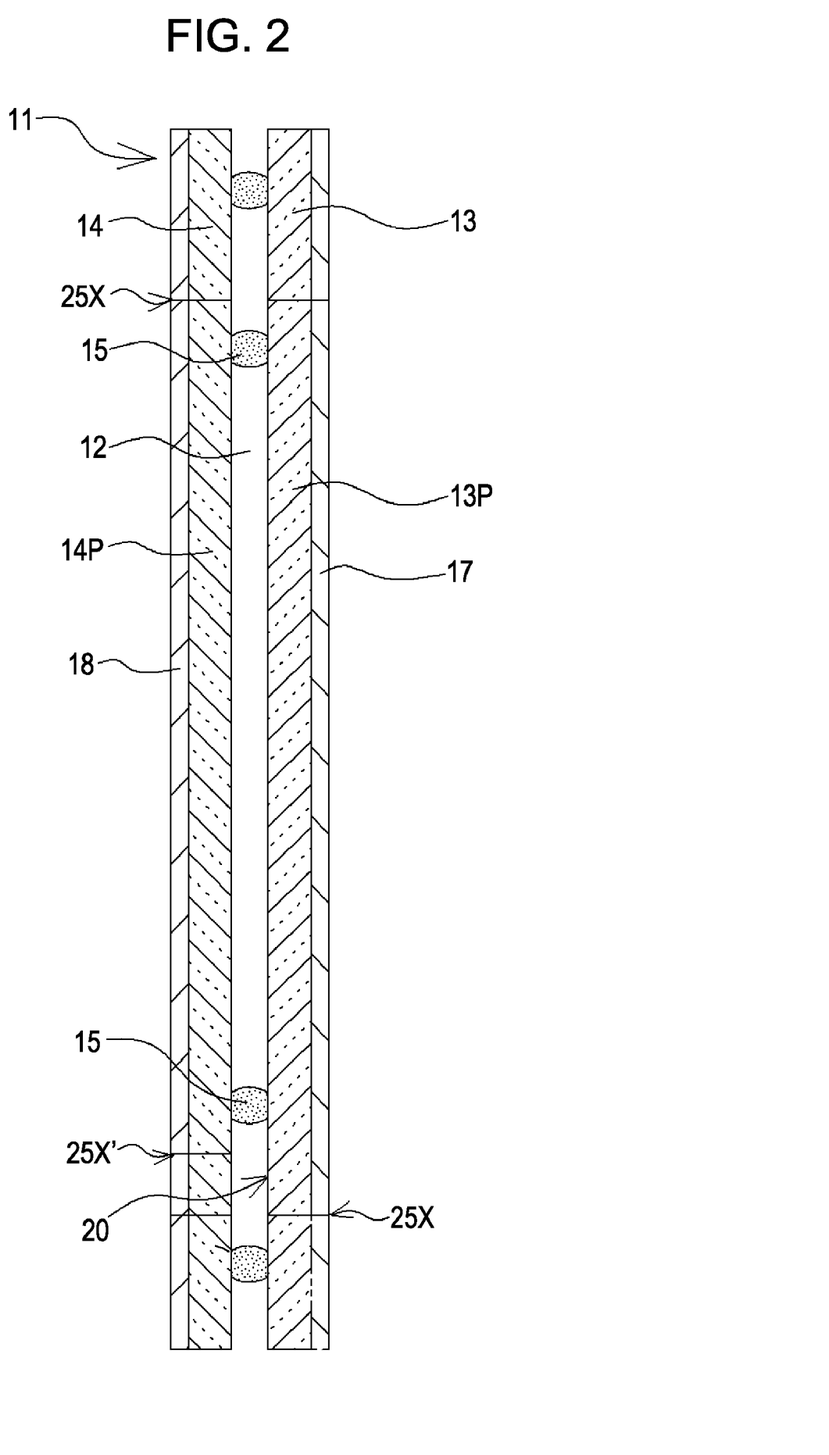
FIG. 2 is a cross sectional view taken along the line II-II of FIG. 1.
Figure 3A:
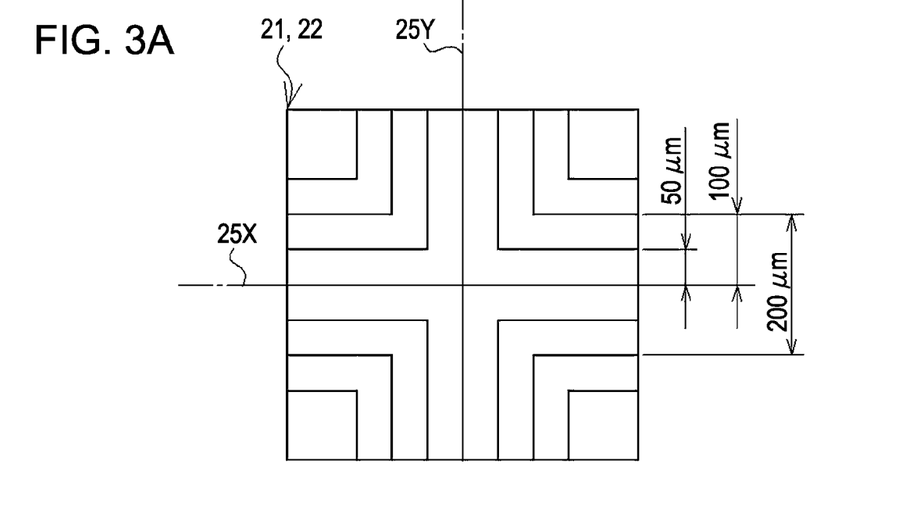
FIG. 3A is an enlarged view showing an alignment mark of IIIA portion of FIG. 1.
Figure 3B:
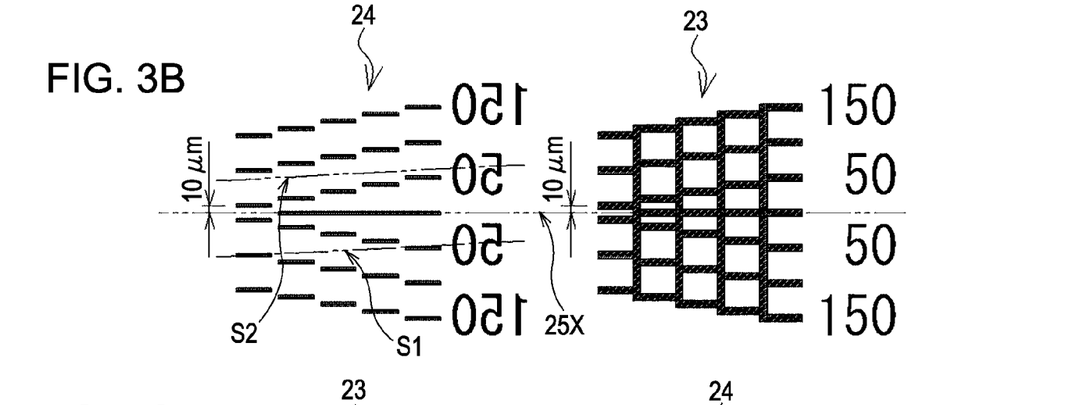
FIG. 3B is an enlarged view showing a slant mark of IIIB portion of FIG. 1.
Figure 3C:
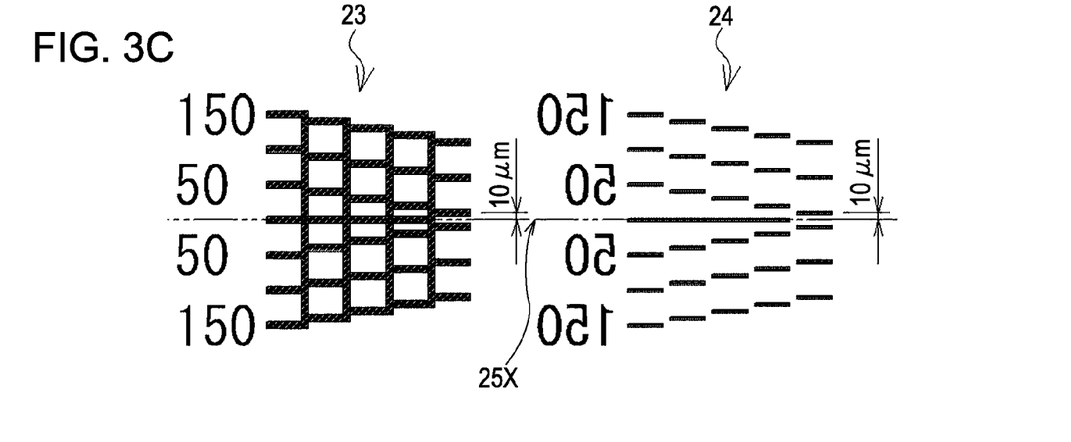
FIG. 3C is an enlarged view showing a slant mark of IIIC portion of FIG. 1.
Figure 4A:
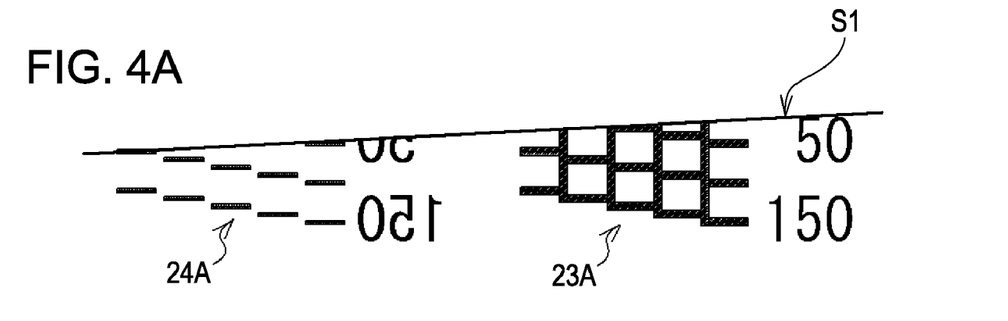
FIG. 4A is an enlarged plan view showing a segmented surface when segmented by a segment line S1 of FIG. 3B.
Figure 4B:
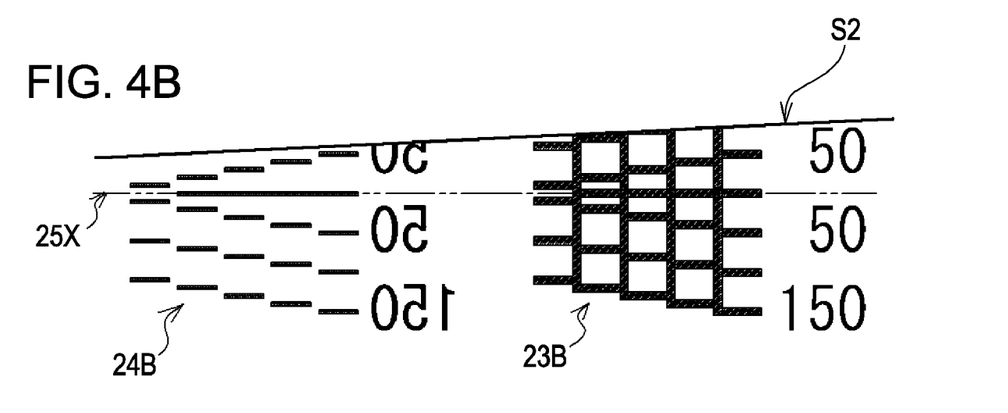
FIG. 4B is an enlarged plan view showing a segmented surface when segmented by a segment line S2 of FIG. 3B.
Figure 4C:
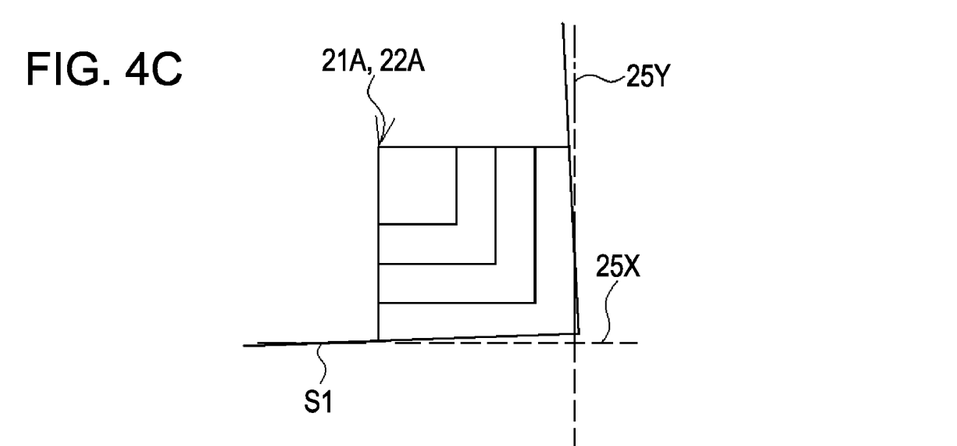
FIG. 4C is an enlarged plan view showing a remaining portion of the alignment mark.
Figure 5:
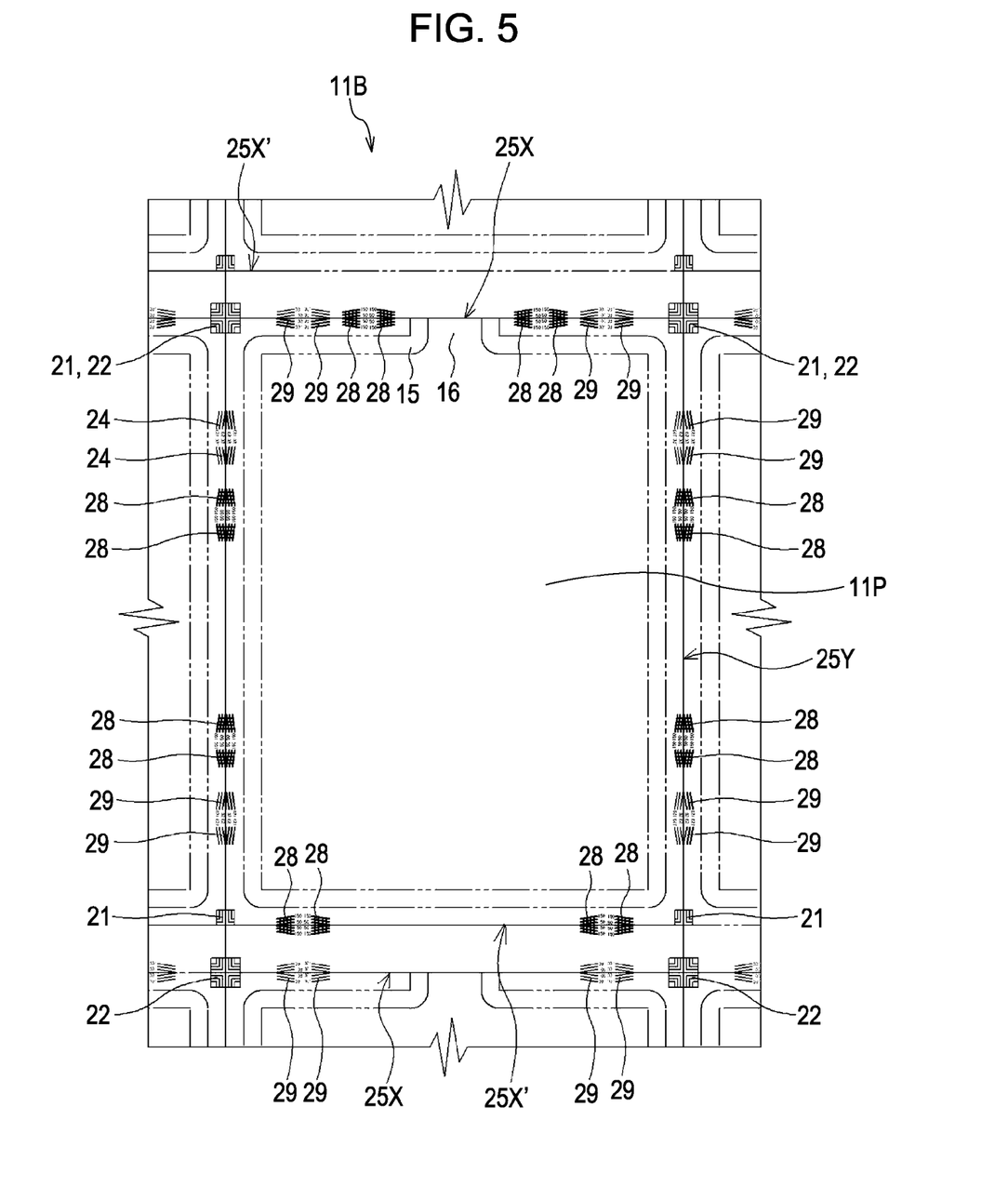
FIG. 5 is a partial plan view showing a large sized display panel according to a second embodiment.
Figure 6A:
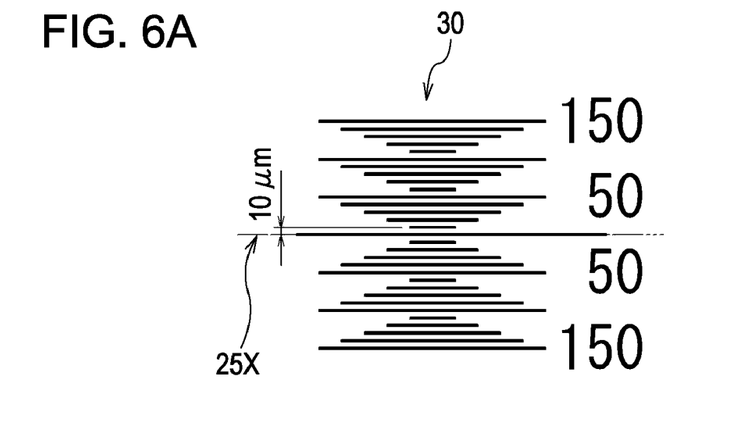
FIG. 6A is an enlarged view showing a slant mark according to a first modification.
Figure 6B:
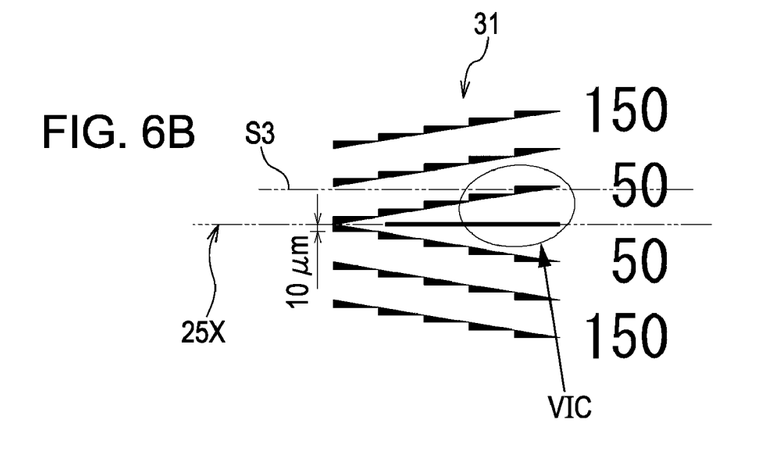
FIG. 6B is an enlarged view showing a slant mark according to a second modification.
Figure 6C:
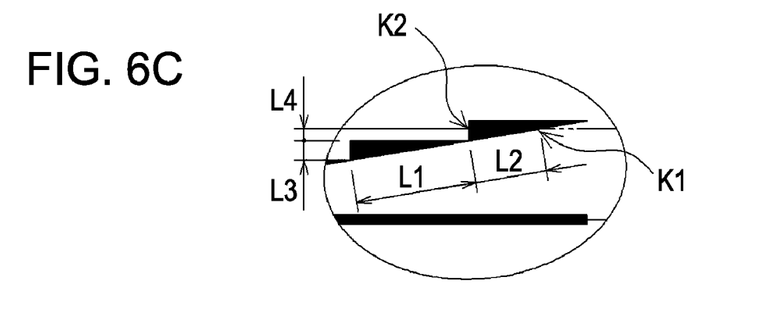
FIG. 6C is an enlarged view showing VIC portion of FIG. 6B.

FIG. 1 is a partial plan view showing a large sized display panel according to a first embodiment. FIG. 2 is a cross sectional view taken along the line II-II of FIG. 1. FIG. 3A is an enlarged view showing an alignment mark of IIIA portion of FIG. 1, FIG. 3B is an enlarged view showing a slant mark of IIIB portion of FIG. 1, and FIG. 3C is an enlarged view showing a slant mark of IIIC portion of FIG. 1. FIG. 4A is an enlarged plan view showing a segmented surface when segmented by a segment line S1 of FIG. 3B, FIG. 4B is an enlarged plan view showing a segmented surface when segmented by a segment line S2 of FIG. 3B, and FIG. 4C is an enlarged plan view showing a remaining portion of the alignment mark. FIG. 5 is a partial plan view showing a large sized display panel according to a second embodiment. FIG. 6A is an enlarged view showing a slant mark according to a first modification, FIG. 6B is an enlarged view showing a slant mark according to a second modification, and FIG. 6C is an enlarged view showing VIC portion of FIG. 6B.

A display panel of the first embodiment will be described with reference to FIGS. 1 to 3C. Note that a large sized display panel 11A shown in FIG. 11 shows a state before segmented into an individual display panel 11P, and solid lines show segment lines for segmenting the large sized display panel 11A into the individual display panel 11P. As shown in FIG. 2, the large sized display panel 11A before segmented includes a space portion 12 in which liquid crystal is injected, an array substrate 13 and a color filter substrate 14 for sandwiching the liquid crystal injected in the space portion 12 from a back surface side and a front surface side, and a seal material 15 for surrounding the circumference of the array substrate 13 and the color filter substrate 14 for every individual display panel 11P. Each of the liquid crystal display panel is manufactured by segmenting the large sized display panel 11A into the individual display panel 11P, and then, injecting liquid crystal in the space portion 12 from a liquid crystal injection hole 16, enclosing the liquid crystal injection hole 16, and boding a first polarizer 17 on a back surface of the array substrate 13 and bonding a second polarizer 18 on a front surface of the color filter substrate 14.

As is omitted in the drawings, a substrate body of the array substrate 13 is made of glass, quartz, plastic, or the like, and a switching element, a lower electrode, an upper electrode, and a first alignment film are formed on the substrate body from a back surface side. A voltage applied between the lower electrode and the upper electrode are turned ON/OFF by the switching element (for example, TFT (Thin Film transistor)), and an initial (when the voltage applied between the lower electrode and the upper electrode is OFF) alignment of the liquid crystal is set by a rubbing treatment performed on the first alignment film. Similarly, a substrate body of the color filter substrate 14 is made of glass, quartz, plastic, or the like, and a second alignment film, a color filter layer through which different color light (R, G, B, or solid color) is passed for every sub pixel area, and a light shielding material layer formed in a predetermined area are formed on the substrate body. Note that a rubbing treatment is performed on the second alignment film in the direction opposite to the rubbing direction of the first alignment film.

Further, the first polarizer 17 and the second polarizer 18 are arranged such that the transmission axis of the first polarizer 17 at the array substrate 13 side and the transmission axis of the second polarizer 18 at the color filter substrate 14 side are perpendicular to each other. The liquid crystal is aligned in parallel along the rubbing direction in an initial state. When a voltage is applied between the lower electrode and the upper electrode, the liquid crystal is rotated at a main direction side of the electric field and realigned. Light-dark display of each sub pixel is performed based on the difference between the initial alignment state and the alignment state when a voltage is applied. Further, as shown in FIG. 2, a projection 20 is formed at an end of the long side of the individual array substrate 13 of the individual display substrate 11P in the extending direction (lower direction in FIG. 2) of the long side of the individual color filter substrate 14P. A terminal or the like for combining a driver for driving liquid crystal not shown in the drawings is formed on the projection 20.

As shown in FIG. 1, alignment marks 21, 22 used for positioning a cutter for segment are formed in the array substrate 13 and the color filter substrate 14 of the large sized display panel 11A. The alignment mark 21 of the color filter substrate 14 is formed by a black matrix made of a metal material or a resin material having light shielding property at the same time when a light shielding member is formed. The alignment mark 22 of the array substrate 13 is formed by a gate metal having light shielding property at the same time when gate lines (scanning lines) are formed. Consequently, the aliment marks 21, 22 can be formed without increasing the number of processes. The alignment marks 21, 22 are formed at crossing pints of lateral and vertical virtual cutting lines 25X, 25X', and 25Y, that is, positions corresponding to the corners of the individual color filter substrate 14P and the individual array substrate 13P of the individual display panel 11P. As shown in FIG. 3A, a scale of size (herein, ±100 μm) that becomes a tolerance of a cutting position is written in the alignment marks 21, 22 by solid lines. Further, a minimum scale of size (herein, ±50 μm) that is half of the tolerance is also written. The virtual cutting line 25X is used for segmenting the large sized display panel 11 into the individual display panel 11P, and is formed at the individual array substrate 13P side and the color filter substrate 14P side. The virtual cutting line 25X' is used for exposing the projection 20 of the individual array substrate 13P on which a driver IC or the like is mounted from the individual display panel 11P, and is formed only at the individual color filter substrate 14P side.

First, the position of a wheel cutter not shown is set to the virtual cutting line 25X by referencing the alignment marks 21, 22. Then, the wheel cutter is moved along the virtual cutting line 25X with a predetermined pressure and at a predetermined speed to form a median crack. The median crack is a plastic deformation caused when a blade edge is bitten in the substrate. Then, a stress is applied to the median crack portion to segment the large sized display panel 11A into a strip shape. The segment is performed to both of the array substrate 13 and the color filter substrate 14, and the large sized display panel 11A is segmented into a strip shape in the direction in which the liquid crystal injection holes 16 for injecting liquid crystal are aligned. Then, liquid crystal is injected in the space portions 12 of the individual display panels 11P aligned in one row to form a strip shape from the liquid crystal injection holes 16 within a vacuum. Then, the liquid injection holes 16 are sealed, and the individual display panel 11P is segmented one by one by segmenting along the virtual cutting line 25Y with the similar cutting method as when the large sized display panel 11A is segmented into the strip shape. Then, by segmenting the individual color filter substrate 14P along the virtual cutting line 25X', the projection 20 of the individual array substrate 13P is exposed.

A testing as for a segmented position, a slant when segmented, or the like is performed to the large sized display panel 11A segmented in a strip shape and the individual display panel 11P. In the testing, not only a testing of whether or not the deviation of the segment lines with respect to the virtual cutting lines 25X, 25Y is within the range of the tolerance (±100 μm) written in the alignment marks 21, 22 is performed, but also a testing of whether or not the slant is within the range of a tolerance (for example, ±0.1 degrees) is performed. The testing of the deviation of the segment lines with respect to the virtual cutting lines 25X, 25Y can be performed by using the alignment marks 21, 22. However, since the pitch of the minimum scale of the alignment marks 21, 22 is 100 μm that is too large, there is a case that the testing of the slant of the segment lines can not be performed with accuracy. In addition, since the alignment marks 21, 22 are formed at the corners of the segment lines that are easily cracked, the alignment marks 21, 22 may be cracked.

Slant marks 23, 24 are formed in the array substrate 13 and the color filter substrate 14 in the large sized display panel 11A used in the first embodiment as shown in FIG. 1. The slant marks 23 are formed in the color filter substrate 14, and the slant marks 24 are formed in the array substrate 13. Two slant marks 23, 24 are formed on each of the virtual cutting lines 25X, 25X' and 25Y corresponding to the four sides of each of the individual color filter substrate 14P and the individual array substrate 13P of the individual display panel 11P so as to be separated in the left and right directions or the up and down directions. The slant marks 23, 24 are formed so as to be separated in the left and right directions or the up and down directions. However, it is preferable that the slant marks 23, 24 are formed at positions apart from the corners of the individual color filter substrate 14P or the individual array substrate 13P by 3 mm. Herewith, even when a corner of the individual color filter substrate 14P or the individual array substrate 13P is cracked, cracking of the slant marks 23 and 24 is reduced.

An enlarged view of the slant marks 23, 24 formed at IIIB portion of FIG. 1 is shown in FIG. 3B. In each of the slant marks 23 and 24, five sets of three pair of parallel lines are symmetrically formed at the both side of the virtual cutting lines 25X and 25Y as the center lines. The five sets are shifted in the lateral direction or the vertical direction in a stepwise manner (five steps) with 10 μm pitch. That is, in the slant marks 23, 24 formed in a stepwise manner shown in FIG. 3B, the upper five sets of the three scales form an upward inclination, and the lower five sets of the three scales form a downward inclination. In this manner, if the slant marks 23 and 24 are formed in a stepwise manner, even when the scales whose pitch is 10 μm are used, a relative position between the segment line and the scales formed in a stepwise manner can be easily measured, so that the scale can be read by using, for example, a loupe whose magnification is about 20 times. Consequently, as compared with the case when the testing is performed by using a microscope, the testing can be performed at a low price and at a short time.

Note that four lines that are perpendicular to the virtual cutting lines 25X, 25X', and 25Y and that connect ends of the upper and lower parallel lines of blocks are formed in the slant mark 23 formed in the color filter substrate 14. In the slant mark 24 formed in the array substrate 13, the four lines is not written, so that the shapes of both slant marks 23 and 24 are different to each other. Since there is no light shielding member in the area in which the slant marks 23 and 24 are formed, the slant mark of the substrate at one side can be seen through from the other substrate side. In this manner, if the shapes of the both slant marks 23, 24 are different, misjudging of the slant mark of one substrate as the slant mark of the other substrate can be avoided. Note that the colors of the both slant marks 23 24 may be different in the case where the shapes thereof are different. For example, the slant mark 23 of the color filter substrate 14 may be formed by a color filter layer forming material instead of the light shielding member.

In addition, the pitch of the parallel lines of the fifth step that are most apart from the virtual cutting lines 25X, 25X', and 25Y of the slant marks 23 and 24 is set to 50 μm. This is because that the size of a number display showing a size becomes not less than 50 μm. If the size of a number display becomes smaller than 50 μm, it becomes difficult to see the number display with a loupe whose magnification is about 20. Note that as the number display in FIGS. 3B and 3C, both of "50 μm" and "150 μm" are used. In addition, in FIGS. 3B and 3C, the slant mark 24 that is a projection view of the number display from the array substrate 13 side is highlighted.

Next, a determining method of the level of the slant of the segment line will be described. A state is shown in which the segment line S1 or S2 slanted at the same angle is formed in the slant mark 24 formed in the array substrate 13 of FIG. 3B. The segment line S1 is positioned at a lower portion of the slant mark 24, and the segment line S2 is positioned at an upper portion of the slant mark 24. The angle of the slant of the segment line S1 with respect to the virtual cutting line 25X is in the anti clockwise direction, and the slant direction of the steps of the slant mark 24 with respect to the virtual cutting line 25X is in the clockwise direction, which are positively and negatively oriented in the reverse directions to each other. On the contrary, the angle of the segment line S2 with respect to the virtual cutting line 25X is in the clockwise direction, and the slant direction of the steps of the slant mark 24 with respect to the virtual cutting line 25X is in the clockwise direction, which are positively and negatively oriented in the reverse directions to each other. Consequently, the possibility that the segment line S1 crosses a line of the slant mark 24 is higher than the possibility that segment line S2 crosses a line of the slant mark 24 to allow the measurement with high accuracy. An example of remaining portions of the slant marks 23A and 24A formed by segmentation on the segment line S1 is shown in FIG. 4A, and an example of remaining portions of the slant marks 23B and 24B formed by segmentation on the segment line S2 is shown in FIG. 4B. Further, an example of a remaining portion of an alignment mark 21A in this case is shown in FIG. 4C.

The two slant marks 23, 24 are separately formed on each of the up side and down side or the left side and right side on the virtual cutting lines 25X, 25X', and 25Y corresponding to each side of the individual color filter substrate 14P or the individual array substrate 13P, and the individual panel is manufactured by adjusting the segmentation such that the segment lines are coincident with the virtual cutting lines 25X, 25X', and 25Y. Accordingly, the possibility that the segment lines crosses the virtual cutting lines 25X, 25X', and 25Y between the two slant marks 23 and 24. Consequently, there exists a portion in which the angle of the segment line with respect to the virtual cutting lines 25X, 25X', and 25Y and the slant direction of the steps of the slant marks 23 and 24 with respect to the virtual cutting lines 25x, 25X', and 25Y are positively and negatively oriented in the reverse directions to each other by setting the slants of the slant marks 23 and 24 formed in a stepwise manner so as to be extended in a direction apart from a center of the individual color filter substrate 14P or the individual array substrate 13P. Consequently, the possibility that the segment line crosses a line of the slant marks 23 and 24 is increased to allow measurement with high accuracy. From the reason, the orientations of the steps of the slant marks 23 and 24 of the right and left IIIB portion (see FIG. 3B) and IIIC portion (see FIG. 3C) of FIG. 1 are reversed. Note that the orientations of the slant marks 23 and 24 of the up and down portions are similarly reversed also in the longitudinal direction of the individual display panel 11P.

A slant mark is added in the large sized display panel 11A according to the first embodiment in a large sized display panel 11B according to a second embodiment. Note that the same reference numerals are used to denote the same elements as the first embodiment, and the description thereof will be omitted.

In the large sized display panel 11A according to the first embodiment, the possibility that the segment lines cross the virtual cutting lines 25X, 25X', and 25Y between the two slant marks separated at the left side and right side or the up side and down side shall be high because the segment lines are adjusted to match the virtual cutting lines 25X, 25X', and 25Y when the panel is manufactured. Accordingly, the slant of the slant mark formed in a stepwise manner is extended in a direction to apart from the virtual cutting lines 25X, 25X', and 25Y. Herewith, the possibility that the segment line crosses a line of the slant mark is increased. However, when the adjustment of the segment line to match the virtual cutting lines 25X, 25X', and 25Y is largely deviated, there is a case that the virtual cutting lines 25X, 25X', and 25Y do not cross the segment lines between the two slant marks separately formed at the left and right sides or the up and down sides. Consequently, in the second embodiment, two slant marks 28, 29 whose slants of steps are reversely oriented to each other are formed near the corner of each of the virtual cutting lines 25X corresponding to the sides of the individual color filter substrate 14P or the individual array substrate 13P. If the structure is employed, the possibility that the segment line crosses a line of the slant marks 28, 29 is further increased, and measurement can be performed with a high accuracy.

Note that the shape of the slant mark is not limited to the shape shown in FIG. 3A, and another shape may be employed. Modifications of the slant mark will be described with reference to FIGS. 6A to 6C. Note that the same reference numerals are used to denote the same elements as the slant mark according to the first embodiment, and the description thereof will be omitted.

As shown in FIG. 6A, two of three scale blocks are symmetrically formed with respect to the virtual cutting line 25 in a slant mark 30 according to a first modification. Each of the scale blocks are formed by five parallel lines whose pitch is 10 µm, and the five parallel lines of each of the upper three scale blocks are formed in an upward stepwise manner, whereas the five parallel lines of each of the lower three scale blocks are formed in a downward stepwise manner. In this manner, if the one slant mark 30 is formed in a stepwise manner in different directions, it is not necessary to provide a pair of slant marks whose slant directions of stepwise portions are different to each other as in the first embodiment and the second embodiment. Further, since the lengths of adjacent scale lines are different, there is also an advantage in that the scale can be easily read.

Further, as shown in FIGS. 6B and 6C, a slant mark 31 according to a second modification has scales that are formed by arranging five rectangular triangles whose rectangular short side is 10 µm in a slant direction. Herewith, the two rectangular sides of the rectangular triangle are provided in a stepwise manner, and the five slants form one straight line. Three sets of the pair of scales are formed at each of the up side and the down side of the virtual cutting line 25X in a symmetric manner. As shown in FIGS. 6C, when a segment line S3 is crossed with the oblique side of the rectangular triangle, a fractional figure of the minimum unit of the scale becomes the division (L2/L1) obtained by dividing the length L1 of the oblique side of the rectangular triangle by the length L2 between an apex of the rectangular triangle and a crossing point K1. In the case of FIG. 6C, since the segment line crosses the fifth rectangular triangle, the deviation between the segment line and the virtual cutting line is 40 µm+L2/L1.

The fractional figure of the minimum unit of the scale can be also measured by the division (L4/L3) obtained by dividing the length L3 of the short side of the rectangular triangle by the length L4 between the apex of the rectangular triangle and a crossing point K2. However, since the oblique line is longer than the short side, in the invention, the fractional figure of the minimum unit can be measured with a high accuracy by using the oblique line.

Note that a deviation of the segment line that is not slanted and parallel to the virtual cutting line can be also measured with high accuracy with the slant mark of the aforementioned each embodiment. Accordingly, the slant mark according to the invention is not limited for testing the slant of the segment line. Further, the slant mark of the invention may be formed by a plurality of lines each having the same length that are symmetrically arranged with respect to the virtual cutting lines 25X, 25X', and 25Y.

Further, the slant mark of the embodiments is formed by parallel lines whose constant pitch is 10 µm. However, the invention is not limited to the parallel lines whose pitch is constant. For example, pitches of parallel lines may be increased like 5 µm, 10 µm, 15 µm, . . . as becomes apart from the virtual cutting line. Alternatively, the pitch of the parallel lines near a threshold of the crossing point may be narrowed.

The entire disclosure of Japanese Patent Application No. 2008-164118, filed Jun. 24, 2008 is expressly incorporated by reference herein.

What is claimed is:

1. A method of manufacturing a display panel including a step of segmenting a large sized substrate into an individual substrate along alignment marks formed in the large sized substrate comprising:
   forming a slant mark formed by a plurality of pairs of scale lines that are symmetric to each other with respect to a center line, the center line being coincident with a center line between the alignment marks; and
   segmenting the slant mark at the same time when the large sized substrate is segmented into the individual substrate along the alignment marks to form remaining portions of the alignment marks and a remaining portion of the slant mark in the individual substrate.

2. The method to claim 1, wherein
the plurality of scale lines are formed in a stepwise manner.

3. The method according to claim 1, wherein
the plurality of scale lines are arranged with a predetermined constant pitch.

4. The method according to claim 3, wherein
the predetermined constant pitch is narrower than a predetermined tolerance size of the alignment mark.

5. The method according to claim 3, wherein the predetermined constant pitch is 10 µm.

6. The method according to claim 1, wherein
the remaining portion of the slant mark is equipped with a number display for every predetermined pitch.

7. The method according to claim 1, wherein
the remaining portion of the alignment mark is formed at each corner of the individual substrate, and at least two of the remaining portions of the slant marks are formed between the remaining portions of the alignment marks.

8. The method according to claim 1, wherein
the display panel is equipped with a first substrate and a second substrate, the remaining portion of the alignment mark and the remaining portion of the slant mark are formed in both of the first substrate and the second substrate, and at least one of colors or shapes of the remaining portions of the slant marks formed in the first substrate and the second substrate are different.

* * * * *